INVENTORS: W. O. DUNNICAN
R. W. LARISCH
BY: C. E. Hirsch Jr.
ATTORNEY

United States Patent Office 3,424,899
Patented Jan. 28, 1969

3,424,899

SIGNAL TIME COMPRESSION SYSTEM

William O. Dunnican, Totowa Borough, and Richard W. Larisch, Morristown, N.J., assignors to Bell Telephone Laboratories, Incorporated, New York, N.Y., a corporation of New York Filed Aug. 11, 1965, Ser. No. 478,845
U.S. Cl. 235—181 17 Claims
Int. Cl. G06g 7/19

This invention pertains to the time compression of signals and, more particularly, to an improved system for the compression of signals in which time compressed samples of an applied signal are recirculated through a delay medium.

The conventional time compression storage system, commonly denoted by the acronym "deltic," comprises apparatus for continuously processing signals without loss of information content. It finds use in signal detection systems employing spectrum analysis, auto-or-cross correlation and the like. In prior art deltic systems, samples of an applied input wave, developed at predetermined intervals of time, are circulated in pulse form in a delay medium. The delay interval of the medium differs from the sampling interval by a small period or interval of time. Logic circuitry is provided, responsive to inhibiting signals developed simultaneously with the sampling signals, for inhibiting further circulation of the pulses upon their coincidence in time with the inhibiting signals. More simply stated, a circulating pulse is inhibited if it appears at the output of the delay medium at the same time that sampling is taking place. Understandably, since the electrical length of the medium differs by a small interval or "bit" of time from the sampling interval, a circulating pulse will "slip" back into the delay medium before the insertion of a new sampled pulse. These pulses are, of course, separated by an interval corresponding to this small bit of time. With each circulation, the pulse precesses in the delay medium an amount equal to this small interval of time. After a number of circulations, dependent on the length of the delay medium and the size of the interval, the recirculating pulse appears at the output of the delay medium coincident in time with sampling and is thus inhibited. Insertion of "new" pulses continues, while those which have precessed the total length of the delay medium are extinguished. A compressed replica of the sampled input signal is therefore continuously recirculating in the loop, i.e., the electrical path which includes the delay medium. Compression is effected by a factor equal to the quotient of the sampling interval divided by the pulse separation in the delay medium.

In conventional applications of time compressor storage systems to signal correlation, an auxiliary recirculating storage system is necessary. At selected intervals of time, a time compressed replica of an input wave is transferred to this auxiliary, stationary store. This non-processing replica is then compared with its precessing counterpart to develop the desired autocorrelation function. In cross correlation systems, the non-precessing signal circulating in the auxiliary storage system is compared with a precessing, time compressed signal, circulating in a separate and distinct deltic.

The use of one or more auxiliary storage systems in conventional prior art systems in inherently expensive, time consuming, and self-limiting in applicability to complex signal analysis. Each distinct storage system necessitates an additional delay medium. In large systems the cost of additional media is prohibitive. More importantly, the composite error resulting from the use of a plurality of temperature sensitive media leads to cumulative inaccuracies in analysis. In addition, signal analysis in prior art systems is limited by the fixed time parameters of the deltics used. Since the rate of precession is necessarily invariant, the speed of analysis is likewise invariant.

It is, therefore, an object of this invention to accomplish complex signal analysis without incurring the detriments inherent in the techniques of the prior art.

Another object of the present invention is to accomplish complex signal analysis without the use of auxiliary storage systems.

Yet another object of this invention is to provide a signal time compression system with a variable rate of precession.

These objects are accomplished, in accordance with the inventive principles described herein, by selectively ordering the pulse information present in the unified signal time compressor of the present invention. The functions served by the two separate and distinct precessing and storage systems of the prior art are combined in a unitary deltic system. More particularly, the circulating and precessing replica of an applied input wave, in one channel of the unified signal compressor of the present invention, is non-destructively reproduced in a separate circulating channel of the compressor. Sampled information of the applied wave is periodically inserted in the first channel, separated by predetermined intervals of time $k/f$, where $k$ is equal to $2^n$ and $n$ is any whole number, and $1/f$ corresponds to a preselected and standardized digit or pulse spacing. Periodically, the pulses circulating in the first channel are non destructively reproduced in the second channel, displaced in time by an amount equal to $k/2f$. This time displacement, equal to half the pulse spacing of the first channel information, enables the information in both channels to be alternately combined in an interleaved fashion and recirculated through a common delay medium. The sampled information in the first channel is continually changing; the information in the second channel is invariant. Means are provided in the second channel for selectively altering the relative precession rate of the two channels, while simultaneously conserving the interleaved order of the two channels of information. More specifically, subject to signals emanating from a master control, the delay of the second channel is altered in steps corresponding to whole multiples of the pulse spacing of the first channel. This selective insertion of delay preserves the interleaved order of the combined channel information while simultaneously allowing the relative rate of precession of the two channels of information to advanced, stopped, or reversed. Thus, without recourse to the use of expensive and inherently inaccurate auxiliary storage systems, the capability and usefulness of compressor systems is significantly improved.

These and further features and objects of the invention, its nature and various advantages, will be readily apprehended upon consideration of the attached drawings and of the following detailed description of the drawings.

Figure 1:
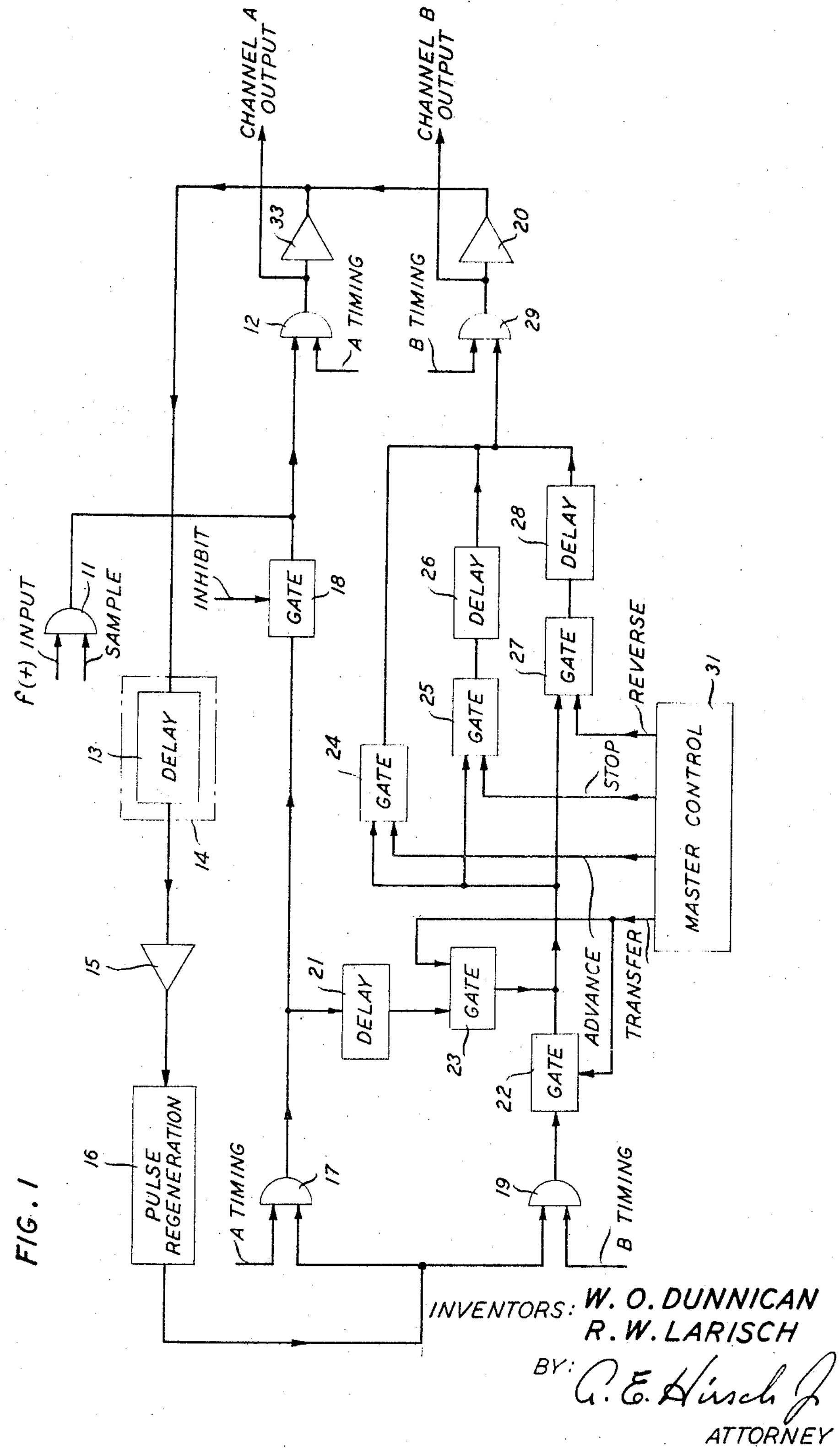
FIG. 1 is a block diagram showing in detail a signal time compression storage system constructed in accordance with the present invention.

The time compression storage system of the present invention is illustrated in detail in FIG. 1. It may be considered to comprise two information channels or loops: channel A, wherein time compressed samples of the information content of an applied wave are circulated, and channel B, wherein a time delayed replica of the channel A information is circulated. Both channels, A and B, are interleaved and recirculated through a common delay medium 13.

Figure 2:
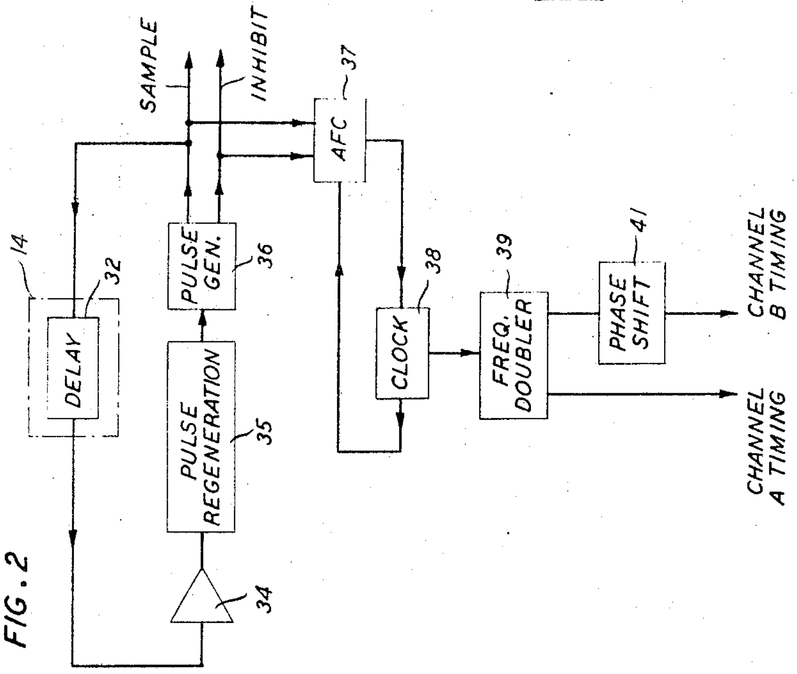
FIG. 2 is a detailed block diagram of timing apparatus suitable for use in the present invention.

Considering, first, information channel A, an input wave $f(t)$ is applied to AND circuit 11 which is enabled by sampling pulses developed by the timing apparatus illustrated in FIG. 2. Sampled information of the applied signal is periodically transmitted by AND circuit 11 to a second AND circuit 12. Sampling normally takes place at intervals of time T, for example, every 500 microseconds. AND circuit 12 is enabled by timing signals emanating from the apparatus of FIG. 2, at extremely short submultiples of this sampling interval. In one typical application of the invention, circuit 12 is enabled, at intervals of time $k/f$, when $k$ is equal to $2^n$ and $n$ is any whole number, and $1/f$ corresponds to a preselected digit or pulse spacing standardized by the timing apparatus of FIG. 2. In one illustrative embodiment of the present invention, $1/f$ is standardized at .1 microsecond and the factor $k$ set equal to 2.0. The width of the sampling pulse which, of course, corresponds to the width of a pulse space in the time compressed replica of the input signal, is also equal to $1/f$. Timing signals applied to circuit 12 aid in synchronizing, with the other time parameters of the circuit the insertion of the sampled pulses into delay medium 13.

The synchronized, sampled pulses of the information wave appearing at the output of AND circuit 12 are conveyed to delay medium 13, of electrical length $$T-\frac{k}{f}$$

via isolation amplifier 33. The information pulses propagated by delay medium 13 are, if desired, applied to amplifier 15 wherein any required compensation may be made for losses present in the delay medium. Amplified information pulses are thereupon supplied to a pulse regeneration network 16. Such networks are well known in the art and may comprise detector and filter circuits for reshaping the form of the circulated pulses. The reshaped pulses are conveyed to the input junction of AND circuits 17 and 19. As to be explained hereafter, AND circuit 17 is enabled in synchronization with the presence of an A channel information pulse; simultaneously AND circuit 19 is disenabled. Those pulses transmitted by circuit 17 are applied to a conventional gate circuit 18. Gate circuit 18 is controlled by inhibiting pulses, developed within the timing apparatus of FIG. 2, simultaneously with the development of sampling pulses.

Since the circulation time through delay medium 13 is less than the sampling interval by a "bit" of time, $k/f$, the circulated pulses will be recirculated through medium 13. Thus the operation of channel A is similar to that of the conventional deltic with the important exception that, so far as described, the spacing between pulses has been selectively chosen.

After a short period of time, a time compressed replica of the sampled input signal is, therefore, continuously recirculating in channel A. In accordance with the present invention, gate 23 is enabled responsive to a transfer signal from master control 31. Control 31 typically comprises sequential signaling apparatus well known to those skilled in the art. During the transfer process gate 22 is inhibited to impede the circulation of extraneous information. All the pulses circulating in the A channel are nondestructively reproduced in the B channel, in a period of time corresponding to one sampling interval, T. These transferred pulses are delayed an amount corresponding to $k/2f$ by delay line 21. This time displacement, equal to half the pulse spacing of the channel A information, enables the information pulses in channels A and B to be combined alternately in an interleaved fashion. Thus, two channels of information circulate in delay medium 13. The pulses of channel A are continually changing, insertion of "new" pulses continues while those which have precessed the total length of the delay medium are extinguished. Simultaneously, the circulating information in channel B is invariant. The channel B pulses, after transfer via gate 23 are conveyed by gate 25, enabled by a "stop" signal emanating from master control 31, to delay line 26. (The terminology selected for identifying the signals of control 31, indicated in FIG. 1, will be appreciated upon further discussion of the invention.) Delay line 26, of an electrical length, $k/f$, transmits the pulses of channel B to AND circuit 29. Circuit 29, enabled by timing signals developed by the apparatus of FIG. 2 coincident in time with the channel B pulses, conveys these pulses to the junction input of delay medium 13.

Certain conclusions may now be drawn regarding the time relationship of the channel A and B pulses. Since the channel B pulses, by the transfer mechanism of the present invention, have been selectively inserted between the A pulses, both pulse trains may be recirculated in delay medium 13 in an interleaved fashion. Also, any delay suffered by the channel B pulses which is a whole multiple of $k/f$, will preserve this relationship. Thus, the time displacement of the B channel information caused by delay line 26, simply initiates a relative regression in time, equal to the pulse spacing of the channel A pulses. In addition, the insertion of delay line 26, by the enabling of gate 25, prevents the B channel information from precessing. If it is recalled that precession takes place because of the difference in time between the sampling interval and total loop delay, it will be readily apparent that the net delay of medium 13 and line 26 is equal to the sampling interval. Thus, with the sampling rate as a reference, the B channel information has been effectively "stopped" in time while the A channel information continues to precess.

Responsive to an "advance" signal from master control 31, gate 24 is enabled. Signals emanating from control 31 are mutually exclusive. Thus, when one signal is present all others are absent; the associated gate circuits are disenabled. Enabling gate 24 removes all delay from the B channel loop with the exception of medium 13. Effectively, the B channel information now precesses at the same rate as the A channel information and in the same direction. Relative to the standardized sampling signals, the B channel pulses have "advanced" in time.

The enabling of gate 27 by a "reverse" signal, and the resultant insertion of delay line 28, which, for example may have an electrical length of $2k/f$, has the opposite effect. The total delay of the B channel loop is now longer than the sampling period. Precession, therefore, takes place in the opposite direction; the rate has been "reversed." The two channels of information, A and B, will now shift with respect to each other at a rate equal to $2k/f$.

Turning now to a consideration of FIG. 2, the function of the apparatus illustrated therein is to provide two sets of timing signals. Two signals, "sample" and "inhibit," are simultaneously developed at intervals of time, T, for sampling the information wave applied to the system of FIG. 1 and inhibiting further recirculation of the pulse replica of the wave after a prescribed number of circulations. In addition, two signals, channel A and channel B timing, respectively, are developed, 180 degrees out of phase, to aid in synchronizing the interleaved channels.

The timing apparatus is equipped with a pulse oscillator 36 regeneratively triggered by pulses circulated through delay medium 32, of an electrical length corresponding to the desired sampling interval. The pulse propagated through delay medium 32 is, if desired, increased in magnitude by amplifier 34 and reshaped in a pulse regeneration network 35. The pulse, after a period of time, T, thus appears again at pulse oscillator 36, which is triggered, starting a new cycle of circulation. The output of oscillator 36 comprises two separate but identical signals, sample and inhibit, for controlling the timing and functioning of the time compression system of FIG. 1. Pulse oscillator 36 may be a blocking oscillator of the type described on pages 282 to 285 of "Pulse and Digital Circuits," Millman and Taub, McGraw-Hill, 1956.

The precise timing required by compressor systems makes it imperative that delay variations with temperature be compensated. Any temperature induced alteration in the delay interval of the recirculation loop must be correspondingly reflected in the duration of the sample-inhibit period. It has been found expedient to introduce the same temperature dependence into the timing apparatus by making the sampling period similarly dependent on delay medium variations with temperature. Both media 32, and 13 of FIG. 1, are enclosed within an isothermal canister 14 to countervail the effect of temperature variations.

It is also imperative that timing signals be developed which accurately preserve the interleaved order of the two recirculating channels of information and also impede the recirculation of undesired information. In order to preserve the interleaved order of channels A and B, an even number of pulses or digit spacings must exist in each sampling interval. Otherwise, after each circulation the channel A information would appear in the B channel and vice versa. In accordance with the present invention, a clock frequency is established which is half that of the desired frequency. Thus, sample and inhibit signals developed by oscillator 36 are also applied to an AFC (Automatic Frequency Control) circuit 37 which may be of any conventional type. Circuit 37 locks the clock 38 signal period to the sample-inhibit period. The period of the clock signal, controlled by AFC Circuit 37, therefore changes in proportion to delay media variations with temperature. The timing signals required are developed by doubling this standardized clock signal by means of doubler circuit 39, which may be of any well-known type. Doubling the frequency of the clock signal insures that an even number of timing signals exists during each sampling interval; doubling an odd or even number always results in an even number. The period of the timing signals is selected at $k/f$, twice the pulse spacing of the interleaved pulses. Of the two output signals available from frequency doubler circuit 39, one is shifted in phase 180 degrees by phase shift device 41, thereby providing two timing signals separated by a period of time equal to the actual pulse spacing, namely, $k/2f$. These two signals, channel A and channel B timing, are applied to the AND circuits 12, 17, 19 and 29 of FIG. 1, to alternately activate the proper channel path.

Delay media 13 and 32 of FIGS. 1 and 2, respectively, may conveniently be acoustic or ultrasonic delay lines, for example, of the quartz or silica type. Such media and associated transducer circuitry are adequately described in "Ultrasonic Delay Lines," Brockelsby, Palfreeman and Gibson, London Illiffe Books, Ltd., 1963.

Master control 31 of FIG. 1, may be any sequential signaling apparatus. For example, where commands of a periodic nature are required, a shift register may adequately serve. Nonperiodic control signals may be provided by semipermanent memory stores, for example, of the twistor memory type, which are sequentially addressed to provide the appropriate command signals.

The present invention may be used in a variety of systems. Advantageously, it can find use in systems for developing the autocorrelation function of a signal. Briefly, this function is obtained by multiplying a sample of an incoming signal by a corresponding sample which has been delayed slightly. This instantaneous product is integrated and the process of multiplication and integration is then repeated for a series of different relative delay times. The resultant integrated product, plotted against the relative delay time, is the desired correlation function. In typical prior art systems, deltics are used to provide a replica of the signal and its delayed counterpart. An auxiliary stationary store, namely, a non-precessing recirculation storage loop is required. The precessing signal of one deltic is compared with its stationary counterpart to develop the correlation signal.

According to the principles of the present invention, no such auxiliary deltic is required. Rather, the two channels of the unified signal compressor are utilized to develop the two necessary signals. In addition, while in prior art systems the precession rate is fixed, the present invention facilitates correlation by the ease and flexibility in which the precession rate may be altered.

Figure 3:
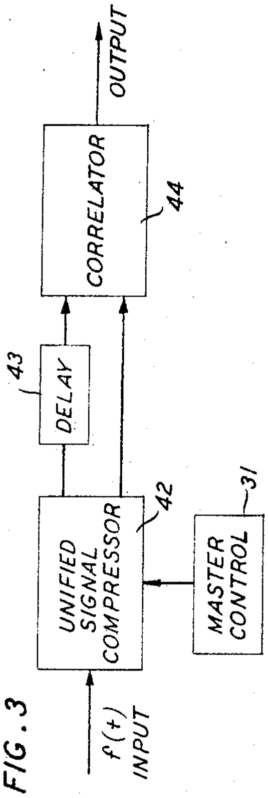
FIG. 3 is a block diagram of an autocorrelator circuit employing the signal time compression storage system of the present invention.

FIG. 3 illustrates an autocorrelator which turns to account the principles of this invention. An input signal $f(t)$ is applied to a unified signal compressor 42, of the type illustrated in FIG. 1. Subject to command signals from master control 31, the compressed replica of the applied signal circulating in the A channel of compressor 42 is nondestructively reproduced in the B channel of the compressor. Depending on the control signals utilized, the relative rate of precession of the two channels may be advanced, stopped or reversed to expedite the correlation process. The output signals of the two channels are applied to correlator circuit 44 which may be a multiplier-integrator or half-add and square circuit. One of the outputs is delayed a period of time equivalent to the pulse separation, $k/2f$, by delay line 43 to bring the interleaved signals into time coincidence. The output of correlator 44 may be applied to any utilization device, e.g., by an X–Y recorder.

Figure 4:
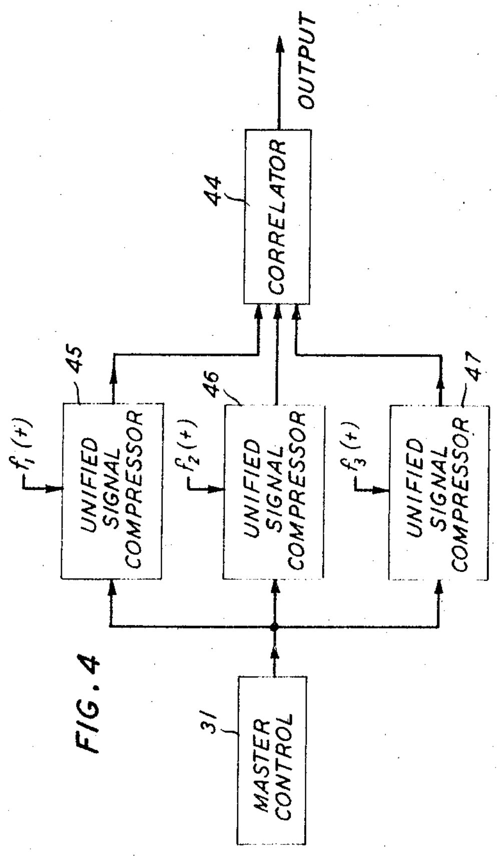
FIG. 4 is a block diagram of a crosscorrelator circuit employing the signal time compression storage system of this invention.

The cross correlation of two or more input signals can be obtained by using the unified signal compressor of the present invention. Again, there is no need to use auxiliary storage deltics to develop the desired signal. FIG. 4 illustrates an autocorrelator wherein three signals, $f_1(t)$, $f_2(t)$ and $f_3(t)$ are correlated. As described above, the outputs of the three unified signal compressors 45, 46 and 47 are properly combined in a correlator 44. In this case, the B channels of the signal compressors are utilized to provide the desired correlated output. Because of the unique manner in which the precession rate of each deltic may be varied, the cross correlator has universal application. Any number of signals may be correlated, each with independent precession rates, to facilitate the ease and speed of correlation. For example, in a typical application, all B channels of the unified signal compressors are capable of having delays of 0, .2, or .4 microsecond inserted in the channel, responsive to the command signals of master control 31. Upon initiation of a transfer signal, the A channel replica of each applied wave is non-destructively reproduced in each respective B channel. Initially, in response to a "stop" signal, the delay of each B channel is arbitrarily fixed at .2 microsecond with a resultant net loop delay equal to the sampling interval. Hence, each B channel will be stationary with respect to this standardized timing interval. In response to an "advance" signal from master control 31, the .2 microsecond delay line in channel B of compressor 45 is removed. A "'reverse" signal from control 31 increases the compressor 47, B channel delay by .2 microsecond. Thus, the pulse trains in the B channels of unified compressors 45 and 47 will precess with respect to each other at a rate of .4 microsecond every sampling interval. In systems employing a plurality of deltics, array gains may be realized for a multiplicity of bearings with ease and convenience, and a corresponding decrease in the number of delay media used. Indeed, when the sequential signaling information of control 31 is provided by alterable memory stores, the present system has universal applicability.

It is to be understood that the embodiments shown and described are illustrative of the principles of the invention only and that further modifications of this invention may be implemented by those skilled in the art without departing from the scope and spirit of the invention. For example, the principles of this invention may find use in any time compressor circuit wherein information pulses are circulated through a delay medium.

What is claimed is:

1. A unified signal time compressor comprising:

a first information channel including a delay medium, a second information channel including said delay medium, means for circulating a time compressed replica of an applied signal in said first information channel, means for periodically reproducing said signal replica in said second information channel, means for selectively altering the delay of said second information channel, means for combining said signal replica of said first channel with the delayed signal replica of said second channel, and means for recirculating said combined signal replicas in said delay medium.

2. A unified signal time compressor as defined in claim 1 wherein said means for selectivity altering the delay of said second information channel comprises:

a plurality of circuit paths each having a predetermined delay in circuit relationship with said second information channel, a source of control signals, and actuating means responsive to said control signals for enabling said circuit paths in accordance with a preselected format.

3. A unified signal time compressor comprising:

a first information channel having a specified delay interval, means for sampling an applied input wave at periodic intervals of time to develop pulse signals representative of the information content of said wave, means for introducing said pulses into said first information channel, means for non-destructively reproducing said pulses of said first information channel in a second information channel, means for selectively altering the delay of said second information channel, and means for combining said pulses of said first and said second information channels in an interleaved fashion.

4. A unified signal time compressor as defined in claim 3 wherein said sampling means comprises:

a source of signals, a delay medium responsive to said source of signals for delaying said signals a period of time corresponding to said sampling intervals, and means responsive to said delayed signals for regeneratively actuating said source of signals.

5. Signal time compression apparatus comprising:

means for sampling an applied input wave at predetermined intervals of time, to develop pulse signals representative of the information content of said applied wave, first electrical path means, including means responsive to said pulse signals, for recirculating said pulses at pulse intervals substantially smaller than said sampling intervals through a delay medium, means for periodically reproducing said recirculating pulses in a second electrical path means, means for selectively delaying said reproduced recirculating pulses, means for combining said recirculating pulses and said delayed reproduced pulses in an interleaved order, and means for recirculating said interleaved pulses through said delay medium.

6. Signal time compression apparatus as defined in claim 5 wherein said sampling means comprises:

a source of signals, a delay medium responsive to said source of signals for delaying said signals a period of time corresponding to said predetermined sampling intervals, and means responsive to said delayed signals for regeneratively actuating said source of signals.

7. Signal time compression apparatus comprising:

means for sampling an applied input wave at periodic intervals of time, T, to develop pulse signals representative of the information content of said wave, a first information channel, including a delay medium, having a specified delay interval $$T-\frac{k}{f}$$

where $k$ is equal to $2^n$ and $n$ is any whole number, and $1/f$ a predetermined submultiple of the time interval T, means for circulating said pulse signals in said first information channel at intervals of time $k/f$, means having a delay interval $k/2f$ for periodically applying said circulating pulse signals to a second information channel, means for selectively altering the delay of said second information channel in increments of delay $k/f$, means for interleaving said pulses of said first information channel with the delayed pulses of said second information channel, and means for recirculating said interleaved pulses in said delay medium.

8. A unified signal time compressor comprising:

a delay medium having an input and an output, first and second circuits connecting the output of said delay medium with the input thereof to form first and second recirculating channels, means for supplying sampled pulse information to said first channel at specified intervals of time, delay means for non-destructively applying said sampled pulse information to said second channel, selectively alterable delay means responsive to said delayed sampled pulse information for altering the rate of precession of said pulse information, means for interleaving said sampled pulse information and said altered pulse information, and means for applying said interleaved information to said delay medium.

9. A unified signal time compressor as defined in claim 8 wherein said selectively alterable delay means comprises:

a plurality of circuit paths each having a predetermined delay in circuit relationship with said second channel, a source of control signals, and actuating means responsive to said control signals for enabling said circuit paths in accordance with a preselected format.

10. Apparatus for storing a time compressed replica of an applied input signal comprising:

a first information channel including a delay medium, a second information channel including said delay medium, means for periodically inserting in said first channel sample pulses of an applied input wave separated by predetermined intervals of time, means responsive to an applied control signal for non-destructively reproducing in said second channel said sample pulses displaced in time by an amount equal to one-half of said predetermined intervals of time, means for selectively altering the delay of said second channel in steps corresponding to whole multiples of said predetermined intervals of time, and means for supplying to said delay medium interleaved pulses of said first and said second channels.

11. Time compression apparatus comprising:

a source of applied signals, first closed electrical path means including a delay medium having a predetermined delay interval, means for sampling said applied signals at periodic intervals of time which differ minutely from said predetermined delay interval, means responsive to said sampling means for circulating samples of said applied signals in said first electrical path means, second closed electrical path means, including said delay medium, for circulating a delayed replica of said samples circulating in said first electrical path means, means in circuit relationship with said second closed electrical path means for selectively altering the relative precession rate of said delayed replica, and means for alternately combining said circulating samples and said delayed replica.

12. Signal time compressor apparatus comprising:

a delay medium having an input and an output, first and second circuits connecting the output of said delay medium with the input thereof to form first and second recirculating channels, means for circulating in said first channel a time compressed replica of an applied input wave, means for periodically reproducing in said second channel a delayed counterpart of said time compressed replica, means in circuit relationship with said second channel for selectively altering the relative precession rate of said time compressed replica and its delayed counterpart, and means for alternately combining said replica and its delayed counterpart.

13. Signal time compressor appratus as defined in claim 12 wherein said means for selectively altering the relative precession rate of said time compressed replica comprises:

a plurality of circuit paths each having a predetermined delay in circuit relationship with said second recirculating channel, a source of control signals, and actuating means responsive to said control signals for enabling said circuit paths in accordance with a predetermined schedule.

14. In combination, logic means for sampling an applied input wave at intervals of time to develop pulse samples representative of the information content of said wave, a first information loop including a delay medium, a second information loop including said delay medium, a sorrce of timing signals, means responsive to said timing signals for propagating said pulse samples in said first information loop, means responsive to said timing signals for propagating a delayed replica of said pulse samples in said second information loop, a source of control signals, means responsive to said control signals for altering the rate of precession of said pulses in said second information loop, and means for recirculating the combined information of said first and second loop in interleaved order in said delay medium.

15. The combination as defined in claim 14 wherein said source of timing signals comprises:

a source of signals, a delay medium responsive to said signals for delaying said signals a period of time corresponding to said sampling intervals, means responsive to said delayed signals for regeneratively actuating said source of signals, a sourc eof signals of a predetermined frequency, means for standardizing said signal frequency relative to said sampling intervals, means for doubling the frequency of the signals of said source to develop two identical signals of the same frequency, and means for shifting the phase of one of said identical signals.

16. Apparatus for developing the autocorrelation function of an applied wave comprising:

a delay medium having an input and output, first and second circuits connecting the output of said delay medium with the input thereof to form a first and second recirculating channel, means for circulating in said first channel a time compressed replica of an applied wave, means for periodically reproducing in said second channel a delayed counterpart of said time compressed replica, means in circuit relationship with said second channel for selectively altering the relative precession rate of said time compressed replica and its delayed counterpart, means for circulating in said delay medium in interleaved order said replica and its delayed counterpart, means for separately detecting said replica and its delayed counterpart, means for delaying said detected replica to bring it into time coincidence with its detected counterpart, and means for processing said delayed detected replica and its detected counterpart to develop the autocorrelation function of said applied wave.

17. Apparatus for developing the cross correlation function of a plurality of applied signals comprising:

a plurality of unified signal time compressors each individually responsive to one of said plurality of applied signals, control means for selectively altering the precession rate of the recirculating replica of each applied signal in each of said signal time compressors, and signal processing means responsive to said recirculating signal replicas for developing the crosscorrelation function of said applied signals.

References Cited

UNITED STATES PATENTS

| | | |
|---|---|---|
| 2,958,039 | 10/1960 | Anderson. |
| 3,144,638 | 8/1964 | Hesler. |

TERRELL W. FEARS, *Primary Examiner.*